(12) United States Patent
Orbay

(10) Patent No.: US 11,092,060 B2
(45) Date of Patent: Aug. 17, 2021

(54) DEVICE AND METHOD FOR CLEANING A SENSOR IN AN EXHAUST SYSTEM

(71) Applicant: Volvo Car Corporation, Gothenburg (SE)

(72) Inventor: Raik Orbay, Hönö (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/367,446

(22) Filed: Mar. 28, 2019

(65) Prior Publication Data
US 2019/0301342 A1  Oct. 3, 2019

(30) Foreign Application Priority Data

Mar. 29, 2018 (EP) .................................. 18165056

(51) Int. Cl.
*F01N 13/00* (2010.01)
*F01N 3/30* (2006.01)
*G01N 27/22* (2006.01)

(52) U.S. Cl.
CPC ............. *F01N 13/008* (2013.01); *F01N 3/30* (2013.01); *F01N 2560/02* (2013.01); *F01N 2560/20* (2013.01); *G01N 27/226* (2013.01)

(58) Field of Classification Search
CPC ............... F01N 13/008; F01N 2560/02; F01N 2560/20; F01N 3/30; G01N 27/226
See application file for complete search history.

(56) References Cited

U.S. PATENT DOCUMENTS

| 6,053,987 | A | 4/2000 | Tanimura et al. |
| 7,610,142 | B1 | 10/2009 | Hoard et al. |
| 2007/0229954 | A1 | 10/2007 | Bral |
| 2008/0156898 | A1* | 7/2008 | Asplund .............. F01D 21/003 239/106 |
| 2015/0020574 | A1* | 1/2015 | Motomura ......... G01N 33/0036 73/23.31 |
| 2017/0268377 | A1* | 9/2017 | Flynn ....................... B08B 3/02 |

FOREIGN PATENT DOCUMENTS

| CN | 103867270 A | 6/2014 |
| DE | 19637726 A1 | 3/1998 |
| DE | 20112032 U1 | 12/2001 |
| EP | 3181844 A1 | 6/2017 |
| JP | 01214326 A | 8/1989 |
| JP | 1029113 A | 11/1998 |

(Continued)

OTHER PUBLICATIONS

JP 2008261820 Machine English translation (Year: 2008).*

(Continued)

*Primary Examiner* — Anthony Ayala Delgado
(74) *Attorney, Agent, or Firm* — Clements Bernard Walker; Christopher L. Bernard

(57) ABSTRACT

An arrangement adapted for removing soot from an exhaust gas sensor in an exhaust gas system of a vehicle comprising a combustion engine, where the arrangement comprises a fluid outlet arranged in an exhaust gas conduit, and where the fluid outlet is adapted to impinge a blast of fluid on the exhaust gas sensor. The advantage of the invention is that an exhaust gas sensor can easily be cleaned in order to ensure a correct reading from the sensor.

19 Claims, 3 Drawing Sheets

(56) References Cited

FOREIGN PATENT DOCUMENTS

| | | | |
|---|---|---|---|
| JP | 11339155 A | | 12/1999 |
| JP | 2008261820 A | * | 10/2008 |
| JP | 2010008077 A | | 1/2010 |
| WO | 2013165296 A1 | | 11/2013 |
| WO | 2014104099 A1 | | 7/2014 |

OTHER PUBLICATIONS

Jun. 25, 2018 European Search Report issue on International Application No. EP18165056.
Office action issued in the corresponding EP application No. 18165056.5. References within were listed prior.
Office action and search report issued in the corresponding CN application No. 201910215907.2.

* cited by examiner

DEVICE AND METHOD FOR CLEANING A SENSOR IN AN EXHAUST SYSTEM

CROSS-REFERENCE TO RELATED APPLICATION

The present patent application/patent claims the benefit of priority of co-pending European Patent Application No. 18165056.5, filed on Mar. 29, 2018, and entitled "DEVICE AND METHOD FOR CLEANING A SENSOR IN AN EXHAUST SYSTEM," the contents of which are incorporated in full by reference herein.

TECHNICAL FIELD

The present invention relates to an arrangement, a vehicle and a method for cleaning a sensor in an exhaust system of a vehicle comprising a combustion engine.

BACKGROUND ART

Vehicles comprising an internal combustion engine are subjected to a plurality of different legislative requirements and regulations. Some of these requirements and regulations are directed to fuel consumption and exhaust emission. Different countries or markets may have different requirements, but most include a specific test cycle that is supposed to give an indication of the fuel consumption and exhaust emission of the vehicle. In another test, exhaust emissions are measured in order to control the efficiency of the exhaust gas aftertreatment system of the vehicle. One part of the exhaust gas aftertreatment system is a lambda sensor, used to measure the exhaust gas concentration of oxygen in the internal combustion engine in order to calculate and, if required, dynamically adjust the air/fuel ratio so that catalytic converters can work optimal, and also to determine whether a catalytic converter is performing properly or not.

One problem that may occur is that the surface of a sensor in the aftertreatment system of a vehicle, e.g. the surface of a lambda sensor, may be contaminated. Soot may deposit on the sensor surface over time. If too much soot deposits on the sensor surface, the measurements of the sensor may be incorrect. Depending on e.g. the driving conditions of the vehicle, this problem may be more or less noticeable. If the vehicle is driven for short intervals in a moderate speed, more soot may deposit on the sensor surface. If the vehicle is driven at high speeds for longer time intervals, the soot may not deposit due to higher temperatures and higher air flow.

It is known to clean sensors arranged in an exhaust gas channel by heating the sensor to a high temperature in order to remove deposit soot from the surface of the sensor. This solution functions when the exhaust gas temperature is high, but is not adapted for internal combustion engines. There is thus room for an arrangement and a method that can clean the surface of a sensor in the exhaust gas aftertreatment system of a vehicle.

SUMMARY

An object of the invention is therefore to provide an arrangement adapted to clean an exhaust gas sensor. A further object of the invention is to provide a vehicle that comprises such an arrangement. A further object of the invention is to provide a method for cleaning an exhaust gas sensor.

In an arrangement adapted for removing soot from an exhaust gas sensor in an exhaust gas system of a vehicle comprising a combustion engine, the object of the invention is achieved in that the arrangement comprises a fluid outlet arranged in the exhaust gas system, and that the fluid outlet is adapted to direct a blast of fluid on the exhaust gas sensor.

By this first embodiment of an arrangement for cleaning an exhaust gas sensor, soot that is deposited on an exhaust gas sensor can be removed in an easy and cost-effective way. When soot deposits on an exhaust gas sensor, the readings of the sensor will become less accurate, and depending on the amount of soot, may even be useless. If the readings of the sensor are inaccurate, the amount of fuel injected into the engine may be incorrect, which will cause the air/fuel ratio of the combustion engine to be either too rich or too lean. This will in turn decrease the reduction of exhaust emissions and will increase the fuel efficiency, and may even damage the catalytic converter. An example of an exhaust gas sensor is a lambda sensor.

The fluid outlet is in one example arranged in the exhaust gas system of the vehicle, upstream of the exhaust gas sensor. The nozzle of the fluid outlet is directed to the active sensor part of the exhaust gas sensor. When it is determined that the exhaust gas sensor is to be cleaned, i.e. that soot on the exhaust gas sensor is to be removed, a short blast of a fluid is directed on the exhaust gas sensor. The fluid blast is relatively short, and preferably shorter than a second. The pressure of the fluid blast is relatively high, and is preferably at least 1 bar. The fluid outlet may comprise one or more nozzles from which the fluid blast is directed. When several nozzles are used, a larger area of the sensor can be cleaned, or even other components such as an exhaust gas recirculation valve could be cleaned.

The blast of a fluid will cause the soot to come off mechanically, since the adhesion force of the soot is relatively weak. When air or an air/liquid mixture is used as a fluid, the added oxygen of the air will also help the soot to oxidize somewhat, which will help the cleaning of the exhaust gas sensor further. When the fluid is a mixture of a gas and a liquid, e.g. a mixture of air and 20% water, the air will contain a vapour when it is injected. The vapour may help to clean the exhaust gas sensor further. The fluid blast is directed on the protective cover of the lambda sensor, which is provided with several openings to allow exhaust gas to enter the lambda sensor such that the exhaust gas can reach the sensor surface of the ceramic sensor element. The fluid blast will in this case remove soot that has covered the openings of the protective cover. The fluid may also remove soot that has deposited on the sensor surface of the lambda sensor.

In a further embodiment, the fluid outlet is arranged inside the exhaust gas sensor. In this case the fluid blast will be ejected inside the protective cover, and the fluid will remove the soot deposited on the openings from the inside. The fluid will also help to remove any soot that has deposited on the sensor surface of the exhaust gas sensor.

In a method for cleaning an exhaust gas sensor in an exhaust gas system of a vehicle, the step of directing a blast of fluid on the exhaust gas sensor is comprised. In a further development of the method for cleaning an exhaust gas sensor in an exhaust gas system of a vehicle, the additional steps of measuring at least one soot influencing parameter and determining if the exhaust gas sensor requires cleaning by comparing the at least one soot influencing parameter with a predefined threshold value are comprised.

By this first embodiment of the method, the method will be able to remove soot from an exhaust gas sensor. The fluid pulse may comprise a single fluid blast or may comprise a series of short fluid blasts. In this way, the readings from the exhaust gas sensor will be correct. By removing soot that has deposited on the openings of the protective cover of the exhaust gas sensor, the exhaust gas will be able to enter into the exhaust gas sensor and reach the sensor surface of the exhaust gas sensor.

The vehicle may comprise a diesel combustion engine or a gasoline combustion engine. The vehicle may be powered solely by the combustion engine, or may be a hybrid vehicle. The method may be performed when the vehicle is driving and when the combustion engine is running, or when the combustion engine is shut off. The method may further be performed after the combustion engine has been shut off and is still warm, or before the combustion engine is started and is cold.

BRIEF DESCRIPTION OF DRAWINGS

The invention will be described in greater detail in the following, with reference to the attached drawings, in which.

DESCRIPTION OF EMBODIMENTS

The embodiments of the invention with further developments described in the following are to be regarded only as examples and are in no way to limit the scope of the protection provided by the patent claims. The used fluid may be a gas, a liquid, or a mixture of a gas and a liquid. In the described examples, air will be used as an example of a fluid.

Figure 1:
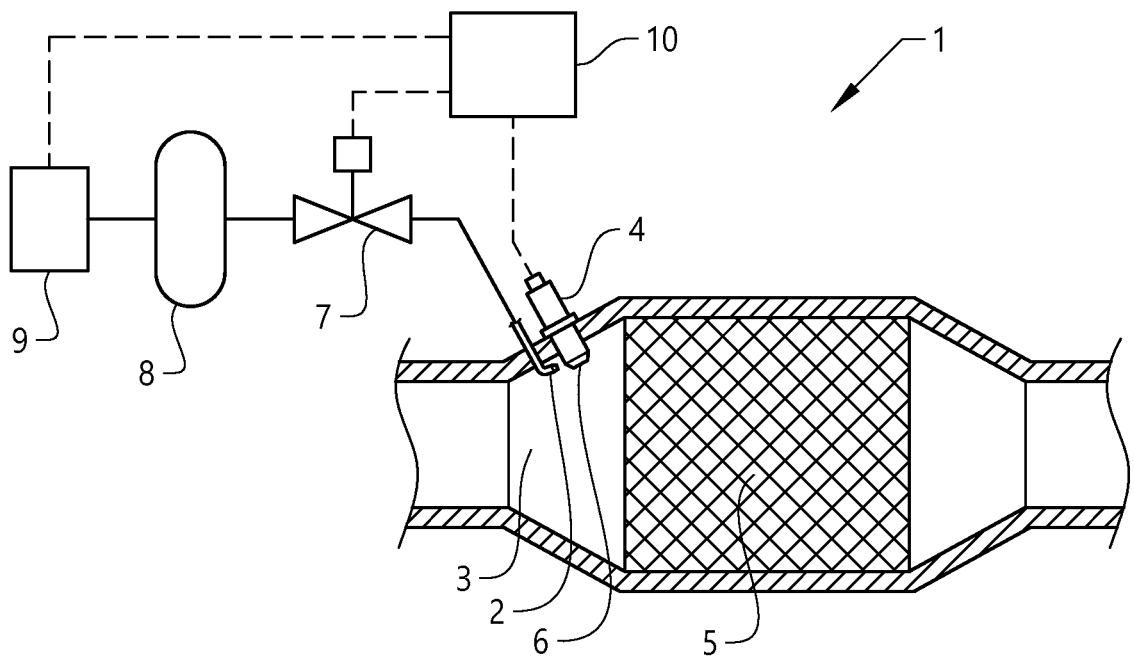
FIG. 1 shows a first arrangement for cleaning an exhaust gas sensor of a vehicle according to the invention.
Figure 2:
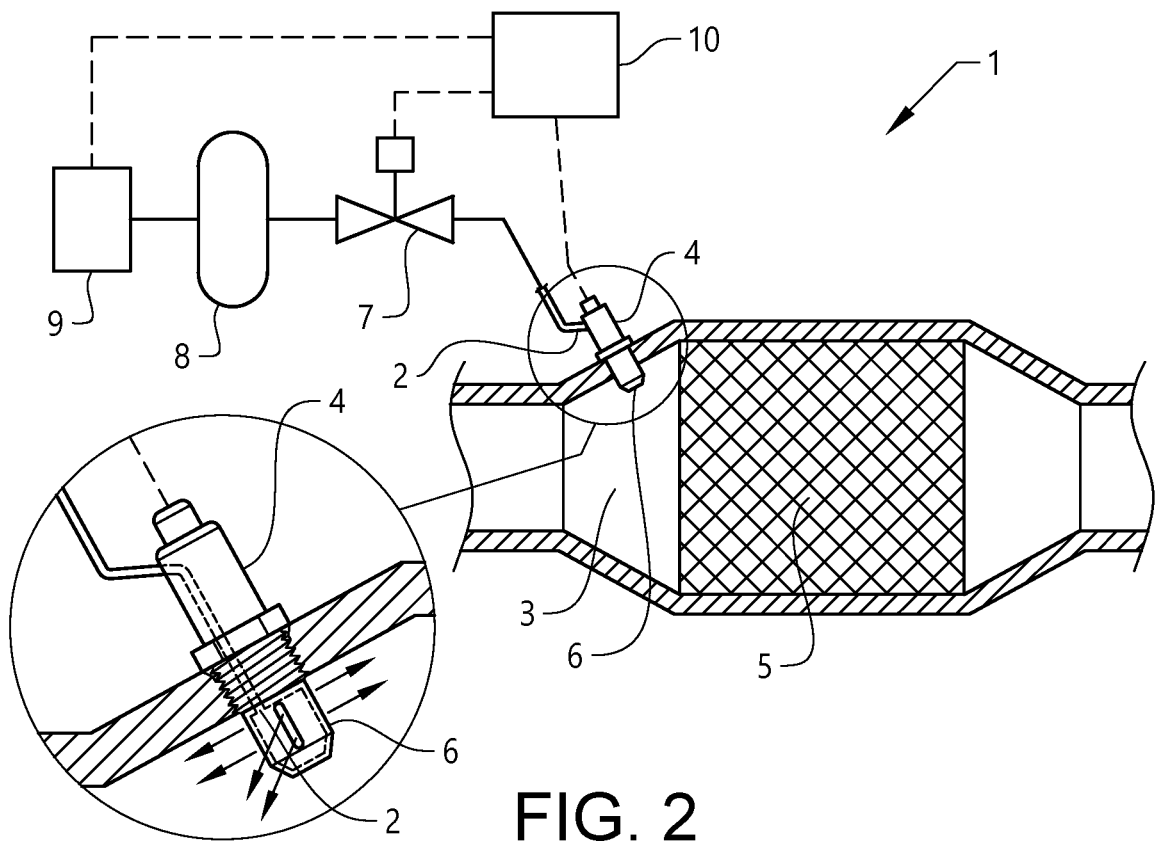
FIG. 2 shows second arrangement for cleaning an exhaust gas sensor of a vehicle according to the invention.
Figure 3:
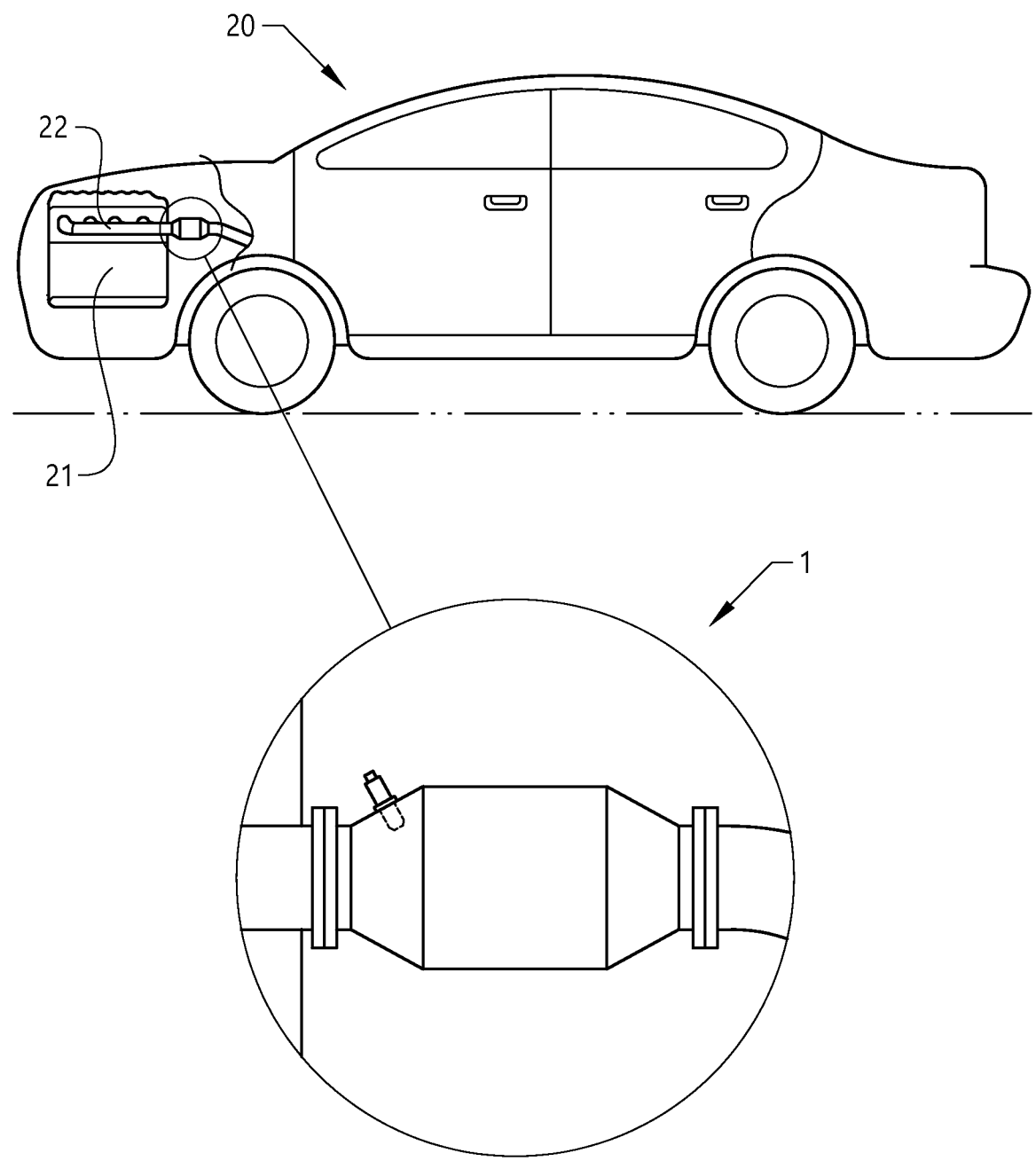
FIG. 3 shows a vehicle comprising an arrangement for cleaning an exhaust gas sensor of a vehicle according to the invention.

FIG. 1 shows a first embodiment of an arrangement for cleaning an exhaust gas sensor of a vehicle comprising a combustion engine, FIG. 2 shows a second embodiment of an arrangement for cleaning an exhaust gas sensor of a vehicle comprising a combustion engine, and FIG. 3 shows vehicle comprising an arrangement for cleaning an exhaust gas sensor.

The vehicle 20 comprises a combustion engine 21, which may be a diesel engine, a gasoline engine or an engine using liquefied natural gas or compressed natural gas. The vehicle may be powered solely by the combustion engine, or may be a hybrid vehicle. The combustion engine comprises an exhaust gas conduit 3 arranged at the exhaust gas side of the combustion engine. The exhaust gas conduit may be part of the exhaust gas manifold 22 of the vehicle.

The arrangement 1 comprises an air outlet 2 arranged in the exhaust gas conduit 3. An exhaust gas sensor 4 is also arranged in the exhaust gas conduit 3. The exhaust gas sensor 4 may be any sensor suitable for being arranged in the exhaust gas system. In this description, a lambda sensor will be used as an example of an exhaust gas sensor 4. A lambda sensor is used to measure the exhaust-gas concentration of oxygen of the internal combustion engine in order to calculate and dynamically adjust the air/fuel ratio so that the catalytic converter can work optimally. The lambda sensor is in the shown example arranged upstream of the catalytic converter 5 such that the exhaust gas is measured before the exhaust gas has passed the catalytic converter 5. This will allow the control system of the engine to adjust the air/fuel ratio in order to optimize the function of the catalytic converter. It is also possible to arrange the lambda sensor 4 downstream of the catalytic converter 5, or to arrange a second lambda sensor 4 downstream of the catalytic converter 5 in order to determine whether the catalytic converter 5 is performing properly or not.

Since the lambda sensor 4 is arranged in the exhaust gas flow upstream of any exhaust gas aftertreatment system, the lambda sensor 4 will be subjected to all emissions of the combustion engine. Some of these emissions may deposit on the surface of the lambda sensor, depending e.g. on the exhaust gas temperature and the type of the emissions. For a diesel engine, condensation of hydrocarbons may deposit at lower temperatures, and ash particles may deposit at slightly higher temperatures. At sufficiently high temperatures, the sensor surface will be hot enough to prevent particles to deposit and may also burn away particles that has deposited. For a vehicle driving at a relatively low speed, e.g. in a city, with low engine speed, there is a risk that a relatively large amount of soot will deposit on the lambda sensor. The amount of soot will e.g. increase if the ambient temperature is low.

The lambda sensor 4 comprises a ceramic sensor element that measures the difference between the amount of oxygen in the exhaust gas and the amount of oxygen in air. An air conduit may lead ambient air to one side of the ceramic sensor, and the other side of the sensor is subjected to the exhaust gas. In one example, the ceramic sensor is a small cylinder where the inner side is subjected to ambient air and the outer side is subjected to exhaust gas. The ceramic sensor element is sensitive, and is for this reason protected by a protective cover of metal. The protective cover comprises a plurality of openings that allows exhaust gas to reach the sensor surface of the ceramic element. When soot deposits on the sensor, the openings may be partly covered which will reduce the exhaust flow into the sensor, or the openings may be completely clogged with soot such that no exhaust gas can enter the sensor. With a reduced or blocked exhaust gas flow into the sensor, the measured value of the amount of oxygen in the exhaust gas will be incorrect, which in turn will cause the fuel injection system to supply an incorrect air/fuel mixture to the combustion engine. The side of the lambda sensor 4 directed to the combustion engine, i.e. the upstream side of the lambda sensor, will be more subjected to the exhaust gas and more soot will thus deposit on this side than on the other side. The openings in the protective cover on the upstream side are more likely to be covered or clogged with soot.

The nozzle of the air outlet 2 is thus arranged upstream of the lambda sensor 4. The air outlet is directed to the protective cover 6 of the lambda sensor 4, with the orifice of the fluid outlet 2 facing the protective cover 6 of the exhaust gas sensor which is to be cleaned. When it is determined that the lambda sensor 4 is to be cleaned, i.e. that soot on the lambda sensor is to be removed, a short blast of air or several blasts of air is directed on the protective cover of the lambda sensor. The number of air blasts is determined e.g. in dependency on the soot layer, the actual combustion engine and the compressor used for the air blast. The soot layer is dependent of various soot influencing parameters including speed of vehicle, speed of engine, output power of the engine, BMEP of the engine, the type of engine, the number of starts, the type of air compressor, lambda sensor age, number of motor hours since the last cleaning of the lambda sensor, ambient temperature, ambient humidity, geographical region, driven distance since last cleaning, calendar time since last cleaning, etc. Brake Mean Effective Pressure (BMEP) is a number calculated from measured dynamometer torque of the engine. An air blast may be directed on the lambda sensor when the vehicle is driving and when the combustion engine is running, or when the combustion engine is shut off. The air blast may further be directed on the lambda sensor after the combustion engine has been shut off and is still warm, or before the combustion engine is started and is cold.

The pulse of air may be relatively short, and is in one example shorter than 1 second, and preferably shorter than 0.5 seconds. If too much air is used, the readings of the lambda sensor or its aging will be affected by the amount of oxygen in the injected air. The air pressure of the pulse of air may be relatively high, and is preferably at least 1.1 bar, and more preferably at least 2.0 bars. In one example, the blast is 100 ms long and the air pressure is 1.5 bars. In another example, the air pressure is lower and the air pulse is longer. With 1.1 bars, the air pulse may be 2 seconds. It is also possible to direct more than one blast of air on the lambda sensor. It is e.g. possible to direct a series of five short air bursts on the sensor, where each air burst is e.g. 200 ms and the time interval between the air bursts is 300 ms.

The compressed air for the blast of air is in one example provided by a forced induction device arranged in the vehicle. In the shown example, a compressor 9 is used. The compressor may e.g. be a compressor of a turbocharger, a crank driven supercharger, or may be a separate air pump of some kind. The compressed air may be supplied directly from the compressor 9, or air may be stored in a small pressure container 8. The arrangement comprises a control valve 7 arranged upstream of the air outlet. The control valve 7 is an on-off valve with a quick response time which can be opened when a blast of air is to be directed on the protective cover. It is of advantage with a quick opening time of the valve 7, such as an air pulse resembling a step-function is obtained. The control valve may e.g. be an electric valve comprising a solenoid. The control valve may be controlled by an electronic control unit 10, preferably integrated in an existing control unit of the engine. It is also possible to use exhaust gas as a fluid. It is important that the exhaust gas is clean, and it is for this reason taken after the exhaust gas aftertreatment system of the vehicle. It is e.g. possible to use a low pressure EGR gas that is taken downstream of the exhaust gas aftertreatment system.

The air outlet 2 may comprise one or more air nozzles from which the blast of air is blown. When several air nozzles are used, a larger area of the lambda sensor can be cleaned, or the lambda sensor can be cleaned from different directions which will increase the efficiency of the arrangement. It would also be possible to clean other components arranged in the exhaust gas system, such as an exhaust gas recirculation valve, an exhaust gas recirculation heat exchanger, etc.

The blast of air will cause the soot to come off mechanically, since the adhesion force of the soot is relatively weak. The velocity of the blast of air is preferably higher or much higher than the speed of the exhaust gas, which will allow the blast of air to remove the soot particles from the protective cover of the lambda sensor 4. An air blast may also remove soot that has deposited on the actual sensor surface of the lambda sensor. The excess oxygen contained in the blasted air will further help to discard the soot through oxidation.

When air is used as a fluid, the injected air may also be mixed with a liquid, e.g. water or a specific cleaning liquid, such that the blast of air will contain a vapour when it is injected. The vapour may help to clean the protective cover of the lambda sensor further. A blast of air comprising a higher density fluid like water may remove soot more efficiently. The injected fluid may also be a liquid, e.g. water or a specific cleaning liquid. When a liquid is injected, the liquid will be injected as a spray comprising small droplets. The dimension and distribution of the droplets may be tailored depending on the application. When a cleaning liquid is used, alone or in combination with air, one possibility is to direct a cleaning liquid on the lambda sensor before the combustion engine is started, e.g. when the humidity is high, in order to prevent soot build-up on the lambda sensor.

In a second embodiment, the air outlet 2 is arranged inside the lambda sensor, where the air outlet 2 is positioned under the protective cover 6 of the lambda sensor. In this case, the blast of air will be injected inside the protective cover, between the protective cover 6 and the ceramic sensor element. The air outlet may comprise more than one air nozzle. The blast of air will blow away the soot deposited on the openings of the protective cover from the inside of the lambda sensor 4. The blast of air will also help to blow away any soot that has deposited on the sensor surface of the ceramic sensor element.

Figure 4:
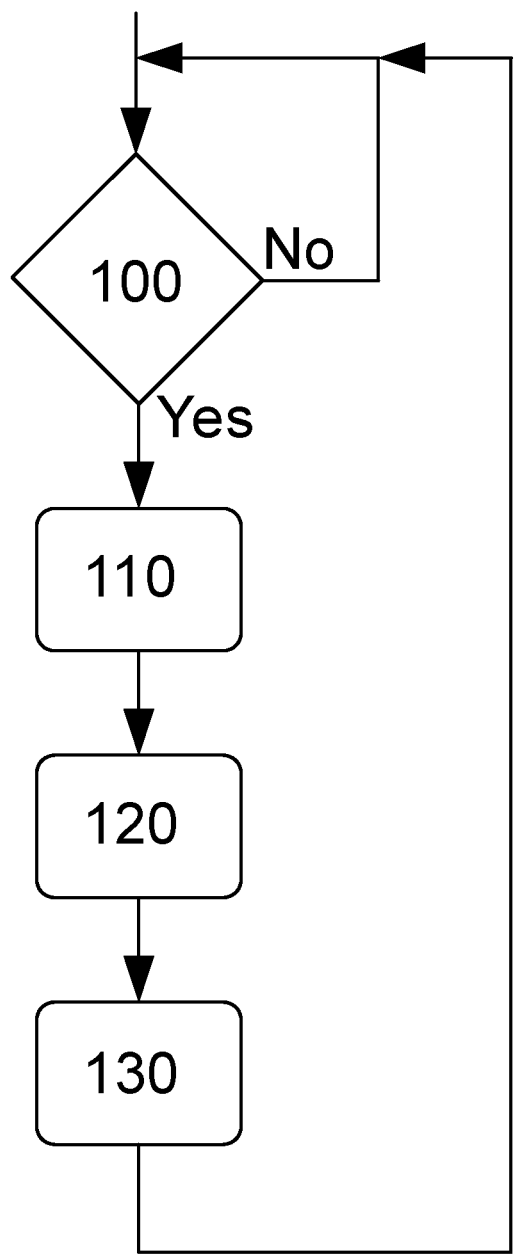
FIG. 4 shows a schematic flow chart of an inventive method for cleaning an exhaust gas sensor of a vehicle.

FIG. 4 shows a schematic flow chart of an example of a method for cleaning an exhaust gas sensor in an exhaust gas system of a vehicle 20. The method may be performed when the vehicle is in driving regime. In order to determine if and when the exhaust gas sensor is to be cleaned, at least one soot influencing parameter may be measured. The measured soot influencing parameter value is compared with a predefined threshold value, and from this comparison, it is determined if and when the exhaust gas sensor is to be cleaned. Soot influencing parameters that may be used to determine if and when the exhaust gas sensor is to be cleaned include speed of vehicle, speed of engine, output power of the engine, BMEP of the engine, the type of engine, the number of starts, the type of air compressor, lambda sensor age, number of motor hours since the last cleaning of the lambda sensor, ambient temperature, ambient humidity, geographical region, driven distance since last cleaning, calendar time since last cleaning, etc. In one example, the driven distance of the vehicle is measured and the exhaust gas sensor is cleaned e.g. every 3000 km, or the calendar time is measured and the exhaust gas sensor is cleaned every 6 months. In other examples, several engine parameters and some driving conditions are measured and compared to predefined threshold values. Some driving conditions will cause soot to deposit on the exhaust gas sensor, and for some driving conditions, no or a limited amount of soot will deposit. The method may be performed when the vehicle is driving and when the combustion engine is running, or when the combustion engine is shut off. The method may further be performed after the combustion engine has been shut off and is still warm, or before the combustion engine is started and is cold.

The method steps are preferably performed by a computer program and a computer program product contained and run in the electronic control unit of the vehicle.

In step 100, at least one soot influencing parameter is measured.

In step 110, it is determined if the exhaust gas sensor requires cleaning by comparing the at least one measured soot influencing parameter with a predefined value. The comparison of the measured value/s and the threshold value/s is performed by an electronic control unit of the vehicle.

In step 120, a signal is sent from the electronic control unit to a controllable valve. The control valve is opened for a predetermined time interval, which preferably is a short time interval being less than 1 second and preferably less than 0.5 seconds.

In step 130, a blast of air is directed to the exhaust gas sensor, which will remove soot that is deposited on the exhaust gas sensor. The soot may also be oxidized by the oxygen in the air.

In step 140, the control valve is closed.

The steps 120 to 140 may be repeated several times if it is determined that a series air blasts is optimal for the cleaning of the exhaust gas sensor. The steps 100 to 110 may be optional. In one example, an air blast is directed on the exhaust gas sensor every 6 months, regardless of the amount of soot deposited on the lambda sensor. By directing an air blast on the lambda sensor at a fixed interval which is shorter than required, soot build-up on the lambda sensor is prevented.

The invention is not to be regarded as being limited to the embodiments described above, a number of additional variants and modifications being possible within the scope of the subsequent patent claims.

The invention claimed is:

1. An assembly adapted for removing soot from an exhaust gas sensor arranged in an exhaust gas system of a vehicle comprising a combustion engine, comprising: a fluid outlet arranged in an exhaust gas conduit and adapted to direct a fluid blast comprising a mixture of air and a liquid on the exhaust gas sensor, with the liquid provided as droplets in the air.

2. The assembly of claim 1, wherein the fluid outlet is positioned upstream of the exhaust gas sensor.

3. The assembly of claim 1, wherein the fluid outlet comprises a plurality of nozzles.

4. The assembly of claim 1, further comprising a valve upstream of the fluid outlet, wherein a control unit is configured to open and close the valve in order to enable the fluid outlet to discharge the fluid blast on the exhaust gas sensor.

5. The assembly of claim 1, wherein the fluid outlet is positioned inside of the exhaust gas sensor.

6. The assembly of claim 1, wherein the fluid blast duration is less than 1 second long.

7. A vehicle comprising the assembly of claim 1.

8. The vehicle of claim 7, further comprising a forced induction device or a dedicated pump adapted to supply fluid to the fluid outlet.

9. A method for removing soot from a sensor in an exhaust gas system of a vehicle comprising a combustion engine, comprising the following steps:
    directing a fluid blast comprising a mixture of air and a liquid on the exhaust gas sensor, with the liquid provided as droplets in the air.

10. The method of claim 9, further comprising the steps of: measuring at least one soot influencing parameter, and determining if the exhaust gas sensor requires cleaning by comparing the at least one soot influencing parameter with a predefined threshold value, where the soot influencing parameter is one or more of: speed of vehicle, speed of engine, output power of the engine, BMEP of the engine, the type of engine, the number of starts, the type of air compressor, lambda sensor age, number of motor hours since the last cleaning of the lambda sensor, ambient temperature, ambient humidity, geographical region, driven distance since last cleaning, calendar time since last cleaning.

11. The method of claim 9, wherein the fluid blast duration is less than 1 second long.

12. A computer program comprising program code means for performing the steps of claim 9 when said program is run on a computer.

13. A computer program product comprising program code means stored on a computer readable medium for performing the steps of claim 9 when said program product is run on a computer.

14. An assembly adapted for removing soot from an exhaust gas sensor arranged in an exhaust gas system of a vehicle comprising a combustion engine, comprising: a fluid outlet arranged in an exhaust gas conduit and adapted to direct a fluid blast comprising a mixture of air and a liquid to the exhaust gas sensor, wherein the fluid outlet is positioned inside of the exhaust gas sensor.

15. The assembly of claim 14, wherein the fluid outlet comprises a plurality of nozzles.

16. The assembly of claim 14, further comprising a valve upstream of the fluid outlet, wherein a control unit is configured to open and close the valve in order to enable the fluid outlet to discharge the fluid blast to the exhaust gas sensor.

17. The assembly of claim 14, wherein the fluid blast duration is less than 1 second long.

18. A vehicle comprising the assembly of claim 14.

19. The vehicle of claim 18, further comprising a forced induction device or a dedicated pump adapted to supply fluid to the fluid outlet.

* * * * *